United States Patent [19]

Walker, Jr.

[11] Patent Number: 5,118,219

[45] Date of Patent: Jun. 2, 1992

[54] METHOD OF CAPPING TAILINGS PONDS

[75] Inventor: Daniel D. Walker, Jr., Henderson, Nev.

[73] Assignee: Chemstar Lime Company, Phoenix, Ariz.

[21] Appl. No.: 672,836

[22] Filed: Mar. 21, 1991

[51] Int. Cl.⁵ ............................ B09B 1/00; E02D 3/12
[52] U.S. Cl. ................................. 405/128; 210/747; 405/263
[58] Field of Search ............... 405/52, 128, 129, 258, 405/263, 264, 266; 210/747

[56] References Cited

U.S. PATENT DOCUMENTS

| 3,718,003 | 2/1973 | Cook et al. ............... 405/129 |
| 3,859,799 | 1/1975 | Jaco ........................ 405/128 |
| 4,028,130 | 6/1977 | Webster et al. ........... 405/129 X |
| 4,149,880 | 4/1979 | Prater et al. . |
| 4,265,770 | 5/1981 | Thomas . |
| 4,399,039 | 8/1983 | Yong . |
| 4,541,752 | 9/1985 | Phillips ................... 405/129 |
| 4,990,031 | 2/1991 | Blowes et al. ........... 405/263 |

FOREIGN PATENT DOCUMENTS 0060902 9/1982 European Pat. Off. ............ 405/128

Primary Examiner—David H. Corbin
Attorney, Agent, or Firm—Charles D. Gunter, Jr.

[57] ABSTRACT

A method is shown for capping a tailings pond of the type which receives fines-containing aqueous effluent from an industrial process. A mineral formulation is prepared by mixing together lime, a pozzolanic component, a sulfate component and water. The mineral formulation is applied to the surface of the fines-containing tailings pond and is allowed to harden to form a surface coating on the tailings pond.

11 Claims, No Drawings

METHOD OF CAPPING TAILINGS PONDS

BACKGROUND OF THE INVENTION

1. Field of the Invention

The present invention relates generally to a method of treating tailings ponds to reduce the attendant adverse environmental impacts thereof and, specifically, to a method for capping a tailings pond which receives fines-containing aqueous effluent from an industrial process to prevent wind driven dusting.

2. Description of the Prior Art

Throughout the Western part of the United States, and other areas where mining activities have previously or are presently occurring, there are thousands of acres of tailings ponds which are subject to "dusting" and the creation of dust storms when accessed by high winds. These ponds are created from finely ground waste ore that has been incorporated into a liquid slurry, pumped to a dammed land area and allowed to settle and dry. In the case of active mining operations, aqueous fines-containing effluent is pumped to the tailings pond area where the water is allowed to collect and clear. The cleared water is then pumped back to the mining operation. A part of these large pond areas are allowed to dry up, so that tailings are maintained at a constant level.

Natural sludge also exists in disposal ponds at various other industrial process sites around the world. The tailings ponds of the phosphate industry in Florida, of the tar sands industry in Canada, and the bauxite industry in Jamaica are three of a virtual multitude of examples in which tailings ponds continue to adversely affect the environment in various manners despite the best efforts of those skilled in the art to significantly improve the problem. The present invention, while applicable to virtually all man-made and naturally occurring disposal ponds made from fines-containing aqueous effluent, sludges and slimes, is discussed in the particular context of ore mining operations in which fines-containing aqueous effluent is pumped to a tailings pond and allowed to settle and dry.

In the case of ore mining operations, especially in the Western part of the United States, mining companies are being faced with increasing environmental regulation and political pressure, in some cases facing shutdown unless they are able to control tailings ponds to prevent dusting. Increased population pressures in the Western United States, make it imperative that an economic solution be found to neutralize the adverse environmental impact of tailings ponds.

The present invention has as its object to provide an effective and economical method for forming a coating or capping material that can be easily applied to the surface of tailings ponds to prevent ore fines from becoming airborne.

SUMMARY OF THE INVENTION

In the method of the invention, a tailings pond of the type adapted to receive fines-containing aqueous effluent from an industrial process is capped to prevent wind driven dusting. A mineral formulation is first prepared by mixing together as primary components lime, a pozzolanic component, a sulfate component and water. The mineral formulation, in the form of a slurry, is applied to the surface of a fines-containing tailings pond, as by pumping or spraying the slurry onto the surface of the pond. The slurry is then allowed to harden to form a surface coating on the tailings pond.

Preferably, the mineral formulation is prepared in the form of a thick aqueous slurry by mixing together high calcium quicklime, fly ash, sulfuric acid, gypsum or other sulfur containing material and water. A fibrous component such as shredded paper fiber can also be incorporated into the mineral formulation. The formulation is preferably prepared by first slaking the lime with water and then adding the fly ash. Thereafter, dilute sulfuric acid is added to the lime-fly ash mixture to form a slurry. The fibrous component can be added to the formulation after adding the diluted sulfuric acid to the lime-fly ash mixture.

Where gypsum is utilized as the sulfur containing material, a dry blend can be prepared of gypsum, high calcium quicklime, fly ash and paper fiber. The dry blend is then combined with water to form the slurry.

Additional objects, features and advantages will be apparent in the written description which follows.

DETAILED DESCRIPTION OF THE INVENTION

While the present invention has applicability to any disposal pond of the type bearing fines-containing aqueous effluent from industrial processes, sludges and slimes, it is particularly effective in the case of tailings ponds associated with ore mining operations where the tailings ponds are subject to dusting, especially in the vicinity of populated areas. In the practice of the method of the invention, a formulated material is prepared which forms a coating or capping material that can be easily applied to the surface of tailings ponds to prevent fine ore from becoming airborne. The formulated material is primarily a mineral formulation which is formed by mixing together lime, a pozzolanic component, a sulfate component and water. Optionally, a fibrous component, such as paper fiber, can be included in the formulation.

The lime component of the formulation is any reactive calcareous component containing calcium and/or magnesium oxide or hydroxide or other form of chemically combined calcium or magnesium which, under the conditions employed in the steps of the method, react with the other siliceous, aluminous and sulfur components of the formulations to form calcium, aluminous, sulfur, silica hydrates, i.e., ettringite and gypsum crystals. The preferred reactive calcareous component is high calcium quicklime. The high calcium quicklime, $CaO$, useful in the present invention has a CaO content of greater than about 90% by weight, preferably greater than about 95% by weight. The reactive calcareous component is preferably present in the formulation from about 1 to 10% by weight, based on the weight of the total mineral formulation including water.

The pozzolanic component of the mineral formulation is a reactive siliceous aluminous component which is employed in the range from about 5 to 20% by weight of the total formulation including water. Such reactive siliceous-aluminous components include artificial or natural pozzolans, pulverized fuel ash (fly ash), granulated slag, pumice dust, ground silica, clays such as bentonite or kaolinite, Portland cement kiln dust and others, as well as mixtures thereof having a pozzolanic character. By "pozzolan" is meant a finely divided material rich in silica or alumina which, while not necessarily cementitious in itself, will react at ordinary temperatures with hydrated lime in the presence of water to form cementicious products. The preferred siliceous-/aluminous component is a fly ash. Fly ash is a commercially available product which will be familiar to those skilled in the art. It is obtained, for example, as a byproduct of coal combustion.

The sulfur component of the formulation is any sulfur containing material which can provide a stoichiometric equivalent amount of sulfur to react with the lime/fly ash to develop ettringite crystals in the mineral formulation. In other words, the combining weights of the elements and compounds provide stoichiometric ratios which permit calculation of the moles of one substance as related to the moles of another substance in any given chemical equation. Preferably the amount of lime, sulfur component and fly ash which are combined in the formulation are selected so that the lime completely reacts with the sulfur component and fly ash to form a reactive product, e.g., ettringite crystals, without leaving a residue in the tailings pond which is subject to weathering.

The sulfur component can be conveniently provided as sulfuric acid, although other sulfur containing materials such as gypsum or flue gas scrubber waste may be used as well. Sulfuric acid is commercially available from a variety of sources containing about 93–98% $H_2SO_4$; the remainder water. Gypsum ($CaSO_4 \cdot 2H_2O$) is a readily available mineral that need only be ground for use in the formulation of the invention. The sulfur component of the formulation, if provided as sulfuric acid, is generally present in the range from about 1 to 5% by weight, based on the total weight of formulation including water.

The mineral formulation can also contain a fibrous component, such as shredded paper fiber, which is prepared by shredding waste paper. The fiber component, if present in the formulation, is present in the range from about 0.1 to 5% by weight, based on the total weight of formulation including water.

The remainder of the formulation is water which can be obtained from any convenient source.

The following examples are intended to be illustrative of a preferred mineral formulation used in practicing the method of the invention:

EXAMPLE I

| High calcium quicklime (CaO . . . ) | 4.2% |
| Fly ash | 13.2% |
| Sulfuric acid | 2.1% |
| Paper fiber | 1.6% |
| Water | 78.9% |

In preparing the mineral formulation, the order of mixing is critical, because of the violent reaction of sulfuric acid with lime and water. Preferably, the lime component is slaked in about one half of the total water required and the fly ash component is then added. The sulfuric acid component, as obtained commercially, is diluted with about one forth of the total water required for the formulation and the dilute sulfuric acid is then added to the lime/fly ash mixture. The fibrous component, if present, and the remaining water can then be added. A thick, aqueous slurry results when the acid is added to the lime/fly ash mixture, because of the formation of ettringite and gypsum crystals. Preferably, as has been mentioned, the lime component is present in an amount effective to completely react with the sulfur and fly ash components so that no unreacted material remains which would be subject to weathering. The amount of water added is sufficient to make a medium viscous slurry which can be pumped and sprayed to apply the slurry to the surface of a tailings pond.

In the following example, the mineral formulation is provided as a dry blend having the following composition:

EXAMPLE II

| High calcium quicklime | 21.0% |
| Fly ash | 65.5% |
| Gypsum | 12.5% |
| Paper Fiber | 1.0% |

The dry blend is then combined with water to form an aqueous slurry, the blend being combined in a ratio of one part dry blend to four parts water.

In practicing the method of the invention, ore fines-containing aqueous effluent is pumped from a mining process to a dammed land area to form a tailings pond. The effluent settles and evaporates leaving a dry or partly wet surface on the pond with little or no pooling on the surface. A mineral formulation is prepared, as previously discussed, and is applied to the dry surface of the fines-containing tailings pond in the form of a viscous slurry. The mineral formulation is then allowed to harden to form a surface coating or "cap" on the surface of the tailings pond. In some industrial processes, the fines-containing aqueous effluent will be allowed to collect and clear in the dammed land area and at least a portion of the clear effluent will be pumped back to the industrial process. After the surface of the pond dries, the mineral formulation can be applied to the surface of the tailings pond to form a surface coating thereon. The method of applying the mineral slurry formulation to the tailings pond can conveniently be either by pumping the formulation or spraying the formulation onto the surface of the pond to form a surface coating thereon.

An invention has been provided with several advantages. The method of the invention provides a tailings pond cap or coating which controls dusting of fines materials which will not crack or break up under reasonable environmental conditions. The components of the mineral slurry formulation form very small needle crystals of ettringite and gypsum that intertwine the fibrous component and create a dense, porous mass that will stay in place during wind and rain storms. The lime component of the formulation used in the practice of the invention combines chemically with the surface of siliceous ore fines, thereby binding the cap material to the surface of the tailings pond. Because of the crystal nature of the capping material of the invention, water will not collect and puddle but quickly percolates through the surface of the cap. The cap, as a result, does not wash away due to normal water flow. The formulation and method of the invention are economical in practice in that low cost, waste materials are primarily utilized in the formulation. The formulation consists of mineral type materials that will not degrade to environmentally unsafe substances.

While the invention has been shown in only one of its forms, it is not thus limited but is susceptible to various changes and modifications without departing from the spirit thereof.

What is claimed is:

1. In a tailings pond system for receiving fines-containing aqueous effluent from an industrial process which is then allowed to dry, the method of capping the tailings pond to prevent wind driven dusting comprising the steps of:

preparing a mineral formulation in the form of a liquid slurry by mixing together lime, a pozzolanic component, a sulfur containing component and water;

applying the mineral formulation to the surface of a fines-containing tailings pond; and allowing the mineral formulation to harden and form a surface coating on the tailings pond.

2. The method of claim 1, further comprising the step of adding a fibrous component to the mineral formulation prior to applying the mineral formulation to the surface of the tailings pond.

3. The method of claim 1, wherein the mineral formulation is prepared by mixing together lime, fly ash, a sulfate component and water.

4. The method of claim 1, wherein the mineral formulation is prepared by mixing together high calcium quicklime, fly ash, sulfuric acid, paper fiber and water.

5. A method for handling the fines-containing aqueous effluent from an industrial process, comprising the steps of:

pumping the fines-containing aqueous effluent to a dammed land area to form a tailings pond and allowing the effluent to dry;

preparing a mineral formulation in the form of a thick aqueous slurry by mixing together lime, a pozzolanic component, a sulfur containing component and water;

applying the mineral formulation to the surface of a fines-containing tailings pond; and allowing the mineral formulation to harden and form a surface coating on the tailings pond.

6. The method of claim 5, further comprising the steps of first allowing the fines-containing aqueous effluent which is pumped to the tailings pond to collect and clear;

pumping at least a portion of the clear effluent back to the industrial process and allowing the remaining effluent to dry;

thereafter applying the mineral formulation to the dry surface of the tailings pond to form a surface coating on the tailings pond.

7. A method for handling the fines-containing aqueous effluent from an industrial mining process, comprising the steps of:

pumping ore fines-containing aqueous effluent from the mining process to a dammed land area to form a tailings pond and allowing the effluent to dry;

preparing a mineral formulation in the form of a thick aqueous slurry by mixing together lime, fly ash, a sulfate component and water, the formulation being prepared by combining the lime, fly ash and sulfate component as a dry blend and combining the dry blend with water;

applying the mineral formulation to the surface of the ore fines-containing tailings pond; and allowing the mineral formulation to harden and form a surface coating on the tailings pond.

8. The method of claim 7, further comprising the step of adding a fibrous component to the mineral formulation prior to applying the mineral formulation to the surface of the tailings pond.

9. A method for handling the fines-containing aqueous effluent from an industrial mining process, comprising the steps of:

pumping ore fines-containing aqueous effluent from the mining process to a dammed land area to form a tailings pond and allowing the effluent to dry;

preparing a mineral formulation in the form of a thick aqueous slurry by mixing together from about 1 to 10% by weight lime, from about 5 to 20% by weight fly ash, from about 1 to 5% by weight sulfuric acid, from about 0.1 to 5% of a fibrous component and the remainder water, all weight percentages being based on the total weight of the mineral formulation including water, the formulation being prepared by first slaking the lime with water and adding the fly ash, thereafter adding sulfuric acid diluted with water to the lime-fly ash mixture, followed by adding the fibrous component;

applying the mineral formulation to the surface of the fines-containing tailings pond; and allowing the mineral formulation to harden and form a surface coating on the tailings pond.

10. The method of claim 9, wherein the amount of lime added to the formulation is selected to be approximately stoichiometricly equivalent to the amount sulfuric acid and fly ash present, whereby the lime completely reacts with the sulfuric acid and fly ash without leaving a residue which is subject to weathering.

11. The method of claim 10, wherein the mineral formulation is prepared by mixing together approximately 4.2% by weight high calcium quicklime, 13.2% by weight fly ash, 2.1% by weight sulfuric acid, 1.6% by weight paper fiber and 78.9% by weight water, all weight percentages being based on the total weight of mineral formulation including water.

* * * * *